(12) United States Patent
Yang et al.

(10) Patent No.: US 8,407,355 B1
(45) Date of Patent: Mar. 26, 2013

(54) SOLVING TIMEOUT ISSUES IN BACKUP DEVICES

(75) Inventors: Xiaosong Yang, Palo Alto, CA (US);
Lin Chen, San Jose, CA (US);
Changming Liu, Cupertino, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 1602 days.

(21) Appl. No.: 11/428,061

(22) Filed: Jun. 30, 2006

(51) Int. Cl.
*G06F 15/16* (2006.01)
*G06F 15/173* (2006.01)
*G06F 11/00* (2006.01)
*H04L 1/00* (2006.01)

(52) U.S. Cl. ........ 709/230; 709/224; 709/228; 709/248; 370/216; 370/217; 370/218

(58) Field of Classification Search ................ 709/204, 709/228, 248, 230, 224; 370/216, 217, 218
See application file for complete search history.

(56) References Cited

U.S. PATENT DOCUMENTS

| | | | |
|---|---|---|---|
| 6,160,805 A * | 12/2000 | Averbuch et al. | 370/350 |
| 2002/0143958 A1* | 10/2002 | Montero et al. | 709/228 |
| 2004/0203378 A1* | 10/2004 | Powers | 455/41.2 |
| 2007/0286206 A1* | 12/2007 | Horn et al. | 370/395.31 |

* cited by examiner

*Primary Examiner* — Peter Shaw
(74) *Attorney, Agent, or Firm* — Harrity & Harrity, LLP

(57) ABSTRACT

A backup device detects that a session timer associated with a session in a session table of the backup network device has expired and ages out the session from the session table based on whether a first message has been sent to a master network device regarding the session and whether a second message has been received from the master network device regarding the session.

21 Claims, 16 Drawing Sheets

| SESSION NO 310 | TIMER 320 | REQ SENT 330 | NACK REC'D 340 |
|---|---|---|---|
|  |  |  |  |
|  |  |  |  |
|  |  |  |  |
| ... | ... | ... | ... |
|  |  |  |  |

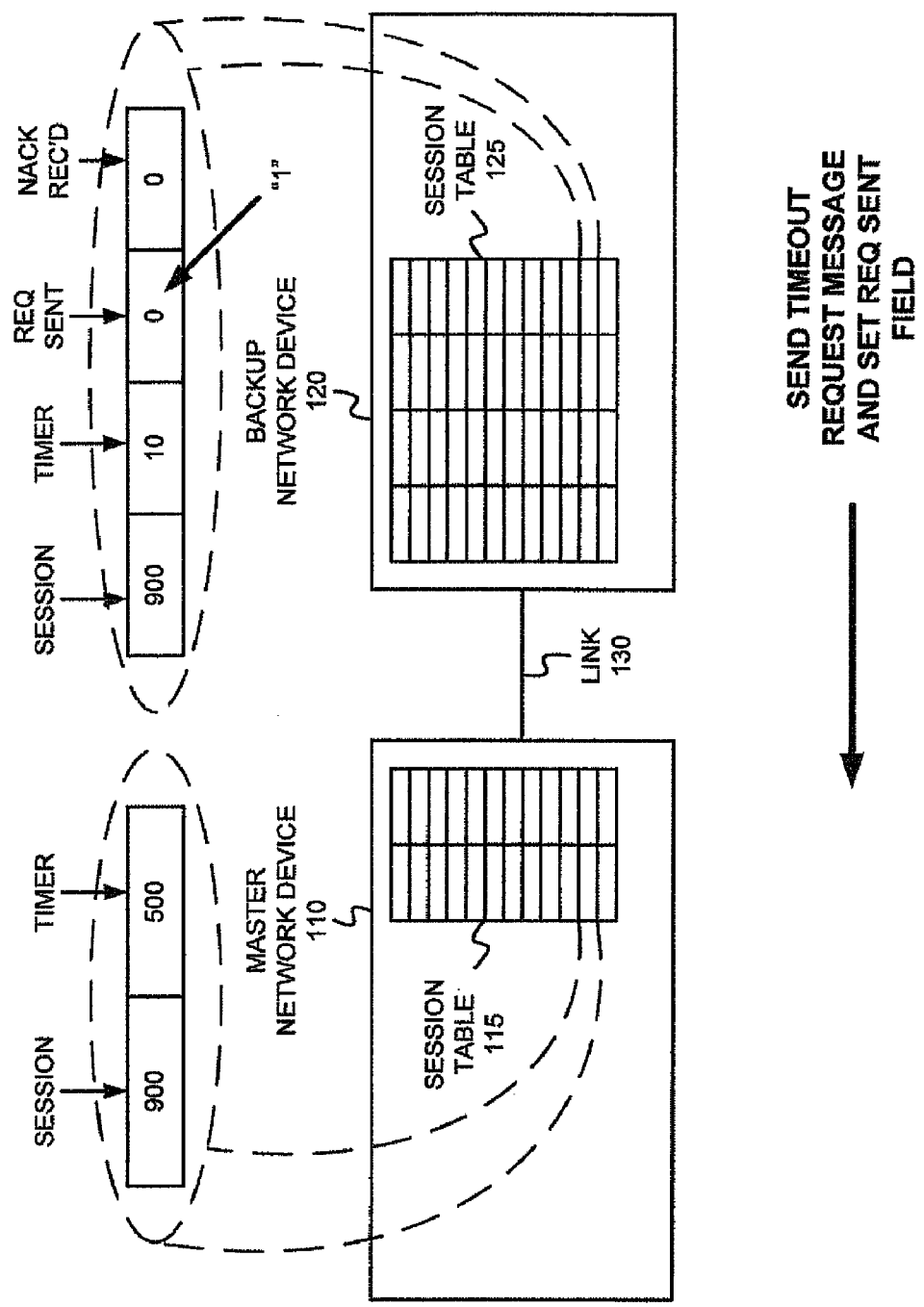

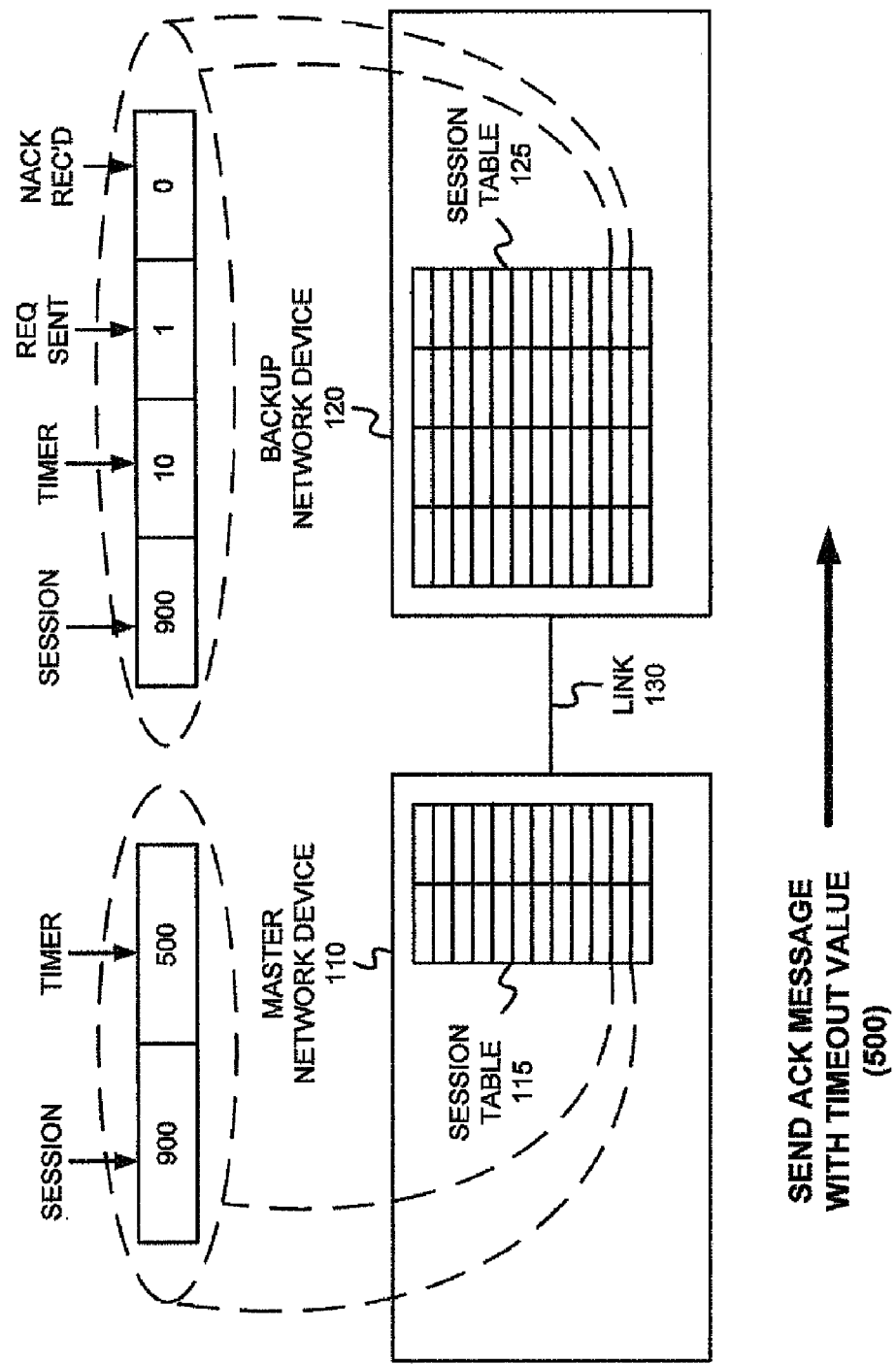

SOLVING TIMEOUT ISSUES IN BACKUP DEVICES

FIELD OF THE INVENTION

Implementations consistent with the principles of the invention relate generally to communications networks and, more particularly, to solving timeout issues in backup devices.

BACKGROUND OF THE INVENTION

A typical communications network includes a lot of different types of network devices. For example, a typical communications network may include host devices, which act as the source or destination of a particular flow of traffic, routers and/or switches, which act to forward traffic flows toward their appropriate destinations, and security devices, which provide, for example, firewall or other security functionality. These different types of network devices may be interconnected via links.

In some instances, a link between a pair of network devices may fail or a network device may fail. In those instances, it is important that the communications network be able to continue to route traffic. Therefore, some networks include redundancy. For example, a second network device may act as a backup for a first network device. If any part of the first network device fails, the entire first network device may failover to the second network device. As such, it is important that the second network device be ready to handle this failover.

The first network device (also called a "master device") may include a session table that includes entries for sessions supported by the master device. The second network device (also called a "backup device") may include its own session table that includes entries for sessions supported by the master device. When a session is created on the master device, the master device may create an entry in its session table and may set a session timer for the session. The master device may also send a create session message to the backup device, which causes the backup device to create the same session in the backup device's session table. As new packets arrive at the master device for the session, the master device may refresh its session timer and transmit a refresh message to the backup device. Due to the high volume of traffic handled by the master device, there are instances where the refresh message may become lost and not reach the backup device and no reliable transmission protocol currently exists to cover the loss. In this case, the backup device may prematurely close a session that is still supported by the master device. Thus, if the master device crashes and a session supported by the master device is not contained in the session table of the backup device, the backup device may need to be restarted to update its session table, which may interrupt ongoing communication sessions.

SUMMARY OF THE INVENTION

In a first implementation consistent with the principles of the invention, a method includes detecting that a session timer associated with a session in a session table of a backup network device has expired and aging out the session from the session table based on whether a first message has been sent to a master network device regarding the session and whether a second message has been received from the master network device regarding the session.

In another implementation consistent with the principles of the invention, a backup network device includes a session table and logic. The session table is configured to store session information relating to a group of sessions supported by a master network device, the session table including an entry for each session of the group of sessions, where each entry in the session table includes a first field configured to store a session number, a second field configured to store a session timer value, a third field configured to store a first flag, and a fourth field configured to store a second flag. The logic detects that the session timer value associated with a session of the group of sessions has reached a first predetermined value, and removes the session from the session table when the first flag has been set and the second flag has been set for the session.

In still another implementation consistent with the principles of the invention, a master network device includes a session table and logic. The session table is configured to store session information for a group of sessions supported by the master network device, the session table including an entry for each session of the group of sessions, where each entry in the session table includes a first field configured to store a session number, and a second field configured to store a session timer value. The logic receives a first message from a backup network device, where the first message includes a first session number for a first session, determines whether the first session exists in the session table in response to receiving the first message, sends a second message to the backup network device when the first session does not exist in the session table, where the second message including the first session number, and sends a third message to the backup network device when the first session exists in the session table, where the third message includes the first session number and the session timer value for the first session.

In yet another implementation consistent with the principles of the invention, a backup network device includes a session table and logic. The session table is configured to store session information relating to a group of sessions supported by a master network device, the session table including an entry for each session of the group of sessions, where each entry in the session table includes a first field configured to store a session number, a second field configured to store a session timer value, and a third field configured to store a flag. The logic receives a message from the master network device, where the message includes a first session number and a first timer value, determines whether the flag has been set for the session corresponding to the first session number, and sets the session timer value for the session corresponding to the first session number to a predetermined value.

In still yet another implementation consistent with the principles of the invention, a system includes a master network device and a backup network device. The master network device includes a first session table configured to store session information for a group of sessions supported by the master network device. The first session table includes an entry for each session of the group of sessions, where each entry in the session table includes a first field configured to store a session number, and a second field configured to store a session timer value. The master network device is configured to receive a first message, the first message including a first session number for a first session, determine whether the first session exists in the first session table in response to receiving the first message, send a second message when the first session does not exist in the first session table, the second message including the first session number, and send a third message when the first session exists in the first session table, the third message including the first session number and the session timer value for the first session. The backup network device includes a second session table configured to store session information relating to the group of sessions supported by a master network device. The second session table includes an entry for each session of the group of sessions, where each entry in the second session table includes a fifth field configured to store a session number, a sixth field configured to store a session timer value, a seventh field configured to store a first flag, and an eighth field configured to store a second flag. The backup network device is configured to detect that a first session timer value for the first session in the second session table has reached a first predetermined value, transmit the first message to the master network device in response to the detecting, set the first flag for the first session in response to transmitting the first message, receive one of the second message or the third message from the master network device, the second message causing the backup network device to set the second flag, the third message causing the backup network device to set the first session timer value to a new value for the first session based on the session timer value from the second message, detect that the first session timer value for the first session in the second session table has reached a second predetermined value, determine whether the first flag and the second flag have been set for the first session, remove the first session from the second session table when the backup network device determines that the first flag and the second flag have been set, and set the first session timer value to the first predetermined value when the backup network device determines that the first flag or the second flag has not been set.

BRIEF DESCRIPTION OF THE DRAWINGS

The accompanying drawings, which are incorporated in and constitute a part of this specification, illustrate an embodiment of the invention and, together with the description, explain the invention. In the drawings.

FIG. 3 is a configuration of an exemplary session table in an implementation consistent with the principles of the invention;

FIGS. 9A-9C illustrate an exemplary process for updating a session timer in an implementation consistent with the principles of the invention.

DETAILED DESCRIPTION

The following detailed description of implementations consistent with the principles of the invention refers to the accompanying drawings. The same reference numbers in different drawings may identify the same or similar elements. Also, the following detailed description does not limit the invention. Instead, the scope of the invention is defined by the appended claims and their equivalents.

Systems and methods consistent with the principles of the invention improve traffic forwarding within a communications network. In an exemplary implementation, a master device includes a session table that includes entries for each communication session handled by the master device. A backup device includes a session table that includes entries corresponding to the entries in the session table of the master device. Through the exchange of status messages between the backup device and the master device, the backup device may avoid prematurely closing an entry in its session table.

Exemplary System

Figure 1:
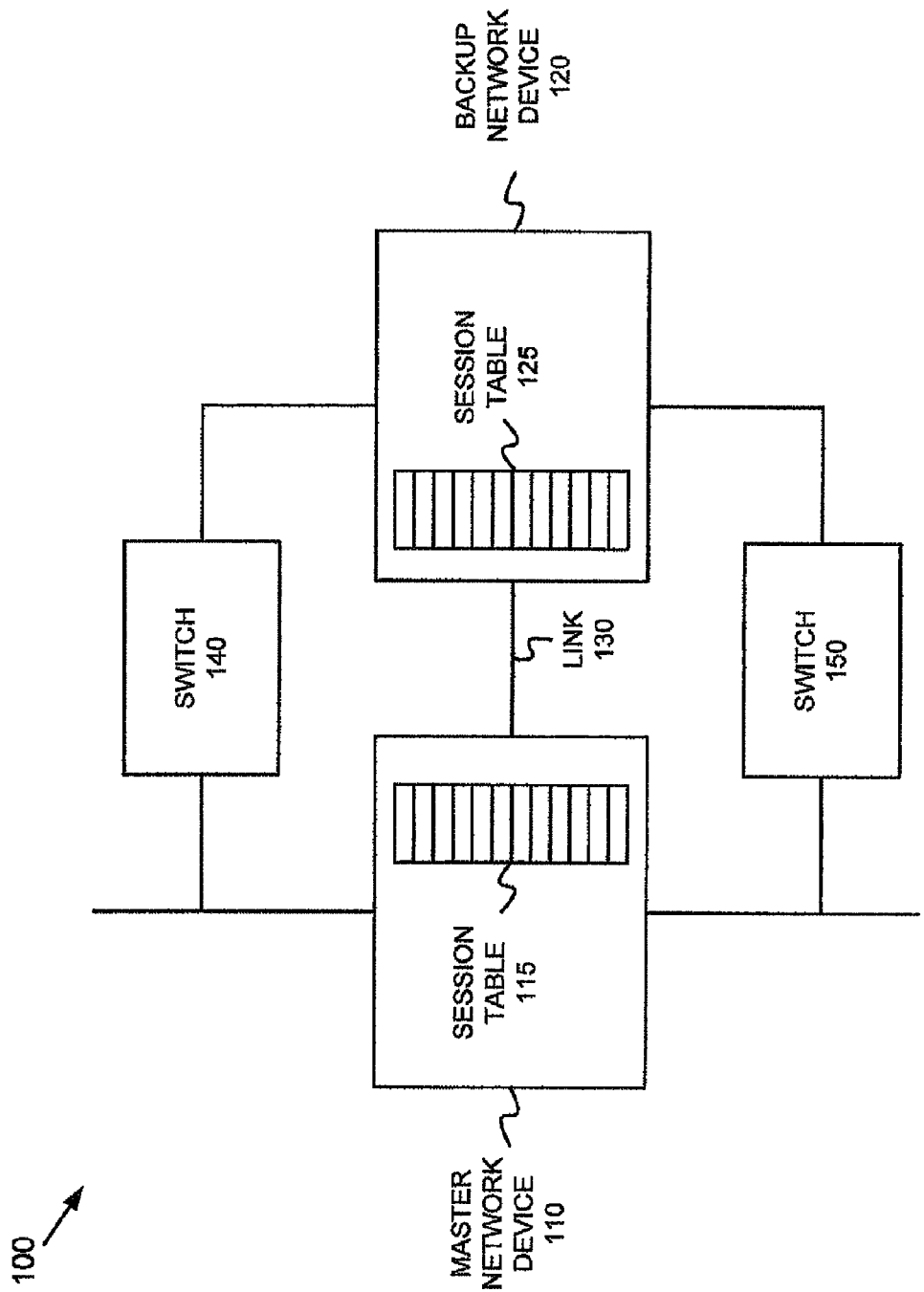
FIG. 1 is a diagram of an exemplary communications network in which systems and methods consistent with the principles of the invention may be implemented.

FIG. 1 is an exemplary diagram of a communications network 100 in which systems and methods consistent with the principles of the invention may be implemented. As illustrated, network 100 may include a network device 110 and a network device 120 that communicate via a link 130. Network 100 may also include switches 140 and 150. It will be appreciated that network 100 may include other devices (not shown) that aid in receiving, processing, and/or transmitting data.

Network devices 110 and 120 may include one or more network devices that receive data units (e.g., Internet Protocol (IP) packets, etc.) and forward the data units toward their destination(s) as part of communication sessions. Network devices 110 and 120 may be capable of supporting on the order of one million concurrent sessions. In some implementations, network devices 110 and 120 may perform one or more security functions, such as filtering the data units. In one implementation consistent with the principles of the invention, network device 110 may serve as a master device and network device 120 may serve as a backup device. If master network device 110 fails, backup network device 120 may handle the functions of master network device 110. While one master network device 110 and one backup network device 120 are illustrated in FIG. 1, it will be appreciated that a typical system could include multiple master network devices 110 and/or multiple backup network devices 120.

Network devices 110 and 120 may be located between one or more source or destination devices and one or more networks, such as a local area network (LAN), a wide area network (WAN), a telephone network, such as the Public Switched Telephone Network (PSTN), an intranet, the Internet, or the like. Alternatively, network devices 110 and 120 may be located between two or more similar or dissimilar networks.

As illustrated in FIG. 1, master network device 110 may include a session table 115. Session table 115 may include a data structure configured to retain information about communication sessions between source devices and destination devices. Implementations of session table 115 may be arranged in a row and column format to facilitate conveying information in session table 115 to an operator and/or for use by another processing device.

Similarly, backup network device 120 may include a session table 125. Session table 125 may include a data structure configured to retain information about communication sessions handled by master network device 110. Similar to session table 115, implementations of session table 125 may be arranged in a row and column format to facilitate conveying information in session table 125 to an operator and/or for use by another processing device.

Master network device 110 may connect to backup network device 120 via a link 130. In one implementation, link 130 may include a dedicated physical link. It will be appreciated that link 130 may be any type of link for communicating information, including a wireless link. Link 130 may allow network devices 110 and 120 to communicate with one another. For example, as described in detail below, network devices 110 and 120 may transmit/receive session status messages via link 130.

Switches 140 and 150 may include one or more devices capable of forwarding data units to master network device 110 and/or backup network device 120. For example, in one implementation consistent with the principles of the invention, switch 140 and/or switch 150 may cause data units to be forwarded to backup network device 120 in instances when master network device 110 has failed.

Exemplary Configuration of Network Device

Figure 2:
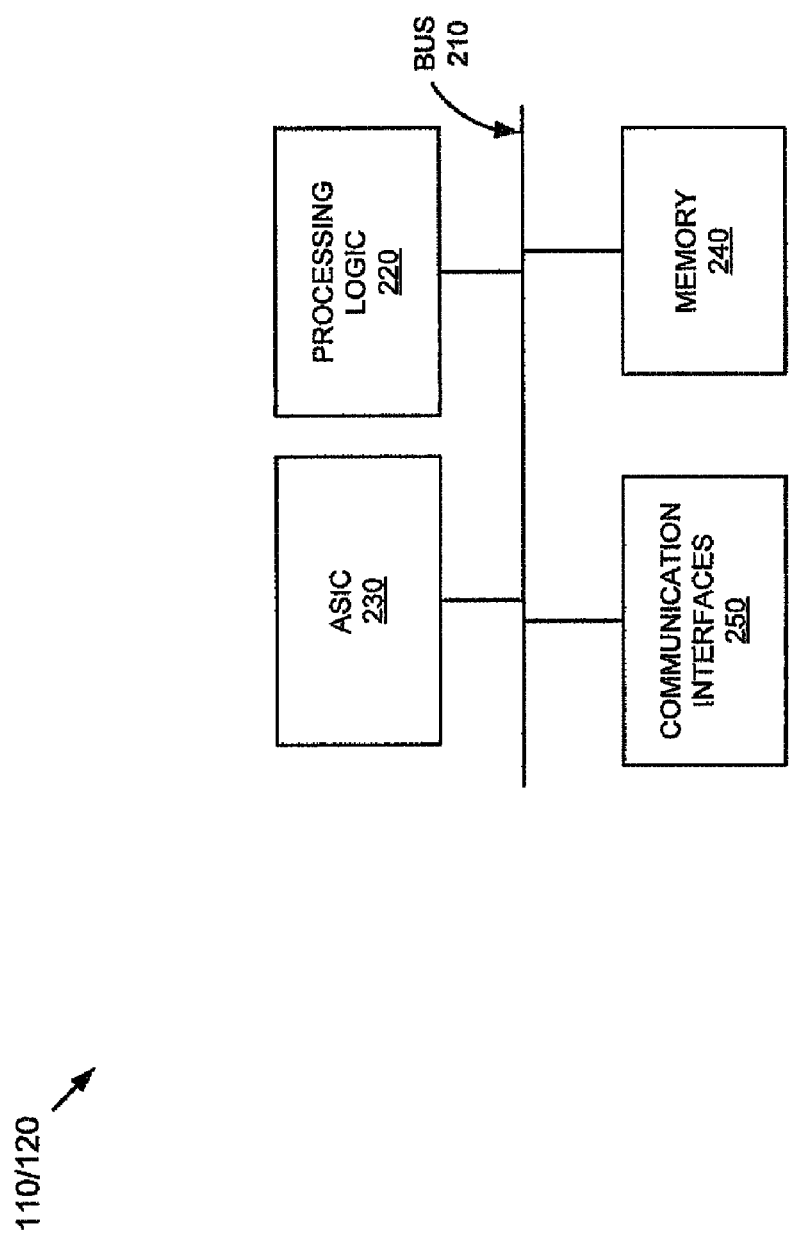
FIG. 2 is an exemplary configuration of the network device of FIG. 1 in an implementation consistent with the principles of the invention.

FIG. 2 is an exemplary configuration of backup network device 120 of FIG. 1 in an implementation consistent with the principles of the invention. It will be appreciated that master network device 110 may be similarly configured. As illustrated, backup network device 120 may include a bus 210, processing logic 220, an Application Specific Integrated Circuit (ASIC) 230, a memory 240, and a group of communication interfaces 250. Bus 210 permits communication among the components of backup network device 120.

Processing logic 220 may include any type of conventional processor or microprocessor that interprets and executes instructions. ASIC 230 may include one or more ASICs capable of performing network-related functions. In one implementation, ASIC 230 may perform a security-related function.

Memory 240 may include a random access memory (RAM) or another dynamic storage device that stores information and instructions for execution by processing logic 220; a read only memory (ROM) or another type of static storage device that stores static information and instructions for use by processing logic 220; and/or some other type of magnetic or optical recording medium and its corresponding drive. Communication interfaces 250 may include any transceiver-like mechanism that enables backup network device 120 to communicate with other devices and/or systems, such as master network device 110.

As will be described in detail below, backup network device 120, consistent with the principles of the invention, may perform network communications-related operations. Backup network device 120 may perform these and other operations in response to processing logic 220 executing software instructions contained in a computer-readable medium, such as memory 240. A computer-readable medium may be defined as one or more memory devices and/or carrier waves. The software instructions may be read into memory 240 from another computer-readable medium or from another device via a communication interface 250. The software instructions contained in memory 240 may cause processing logic 220 to perform processes that will be described later. Alternatively, hardwired circuitry may be used in place of or in combination with software instructions to implement processes consistent with the principles of the invention. Thus, systems and methods consistent with the principles of the invention are not limited to any specific combination of hardware circuitry and software.

Exemplary Session Table Configuration

FIG. 3 is an exemplary configuration of session table 125 of backup device 120 in an implementation consistent with the principles of the invention. Session table 115 of master device 110 may be similarly configured. As illustrated, session table 125 may include a session number (NO) field 310, a timer field 320, a request (REQ) sent field 330, and a non-acknowledgment (NACK) received (RECD) field 340. It will be appreciated that session table 125 may include fields other than those illustrated in FIG. 3. For example, session table 125 may include source and/or destination identification fields that identify a source and/or destination device that is part of each communication session.

Session number field 310 may store information identifying the session number (or identifier) of each communication session associated with master network device 110 (as indicated above, session table 125 stores entries corresponding to entries stored in master network device 110). Each session number may be a unique combination of characters.

Timer field 320 may store a counter value for the session identified in session number field 310. Timer field 320 may automatically decrement the counter value based, for example, on a clock within backup network device 120. In one implementation consistent with the principles of the invention, the counter value may be stored in seconds (or another unit of time or units of time).

Request sent field 330 may store a flag indicating whether a timeout request has been sent by backup network device 120 for the corresponding session. In one implementation, a flag value of "1" may indicate that a timeout request has been sent and a flag value of "0" may indicate that a timeout request has not been sent. As used hereinafter, a flag value of "1" indicates that the flag has been set and a flag value of "0" indicates that the flag has been cleared.

Non-acknowledgment field 340 may store a flag indicating whether a non-acknowledgment message has been received by backup network device 120 for the corresponding session. In one implementation, a flag value of 1 may indicate that a non-acknowledgment message has been received and a flag value of 0 may indicate that a non-acknowledgment message has not been received.

As indicated above, session table 115 of master network device 110 may include fields similar to those described above for session table 125. In one implementation consistent with the principles of the invention, session table 115 may not include request sent field 330 or non-acknowledgment field 340.

Exemplary Processing

FIGS. 4-8 are flowcharts of exemplary processing for updating session tables in an implementation consistent with the principles of the invention. The processing described with respect to FIGS. 4 and 6-8 may be performed by backup network device 120 and the processing described with respect to FIG. 5 may be performed by master network device 110.

When a new session is created, master network device 110 may create a new entry in session table 115 for the new session. Master device 110 may store a session number for the new session in session table 115 (e.g., in session number field 330) and may begin a session timer for the new session (by, for example, storing a counter value in timer field 320 of session table 115). Upon creation of the new entry in session table 115, master network device 110 may transmit a create session message to backup network device 120 (e.g., via link 130) to inform backup network device 120 of the new session. The create session message may include, for example, the session number and the counter value that master network device 110 stored in session table 115 for the new session.

In response, backup network device 120 may create a new session in session table 125 for the new session. Backup network device 120 may store the session number and a counter value, based on the counter value in the create session message, in session table 125 for the new session. In one implementation consistent with the principles of the invention, backup network device 120 may determine the counter value for session table 125 by multiplying the counter value from the create session message by a factor. For example, backup network device 120 may multiply the received counter value by 8 and store the resulting value in timer field 320 of session table 125. Alternatively, backup network device 120 may determine the counter value for session table 125 by multiplying a default counter value (e.g., 30 minutes) by a factor. For example, backup network device 120 may multiply the default counter value by 8 and store the resulting value in timer field 320 of session table 125. On master network device 110, through traffic may refresh the session timeout values. On backup network device 120, there is no through traffic and session timeout value will decrease naturally.

Figure 4:
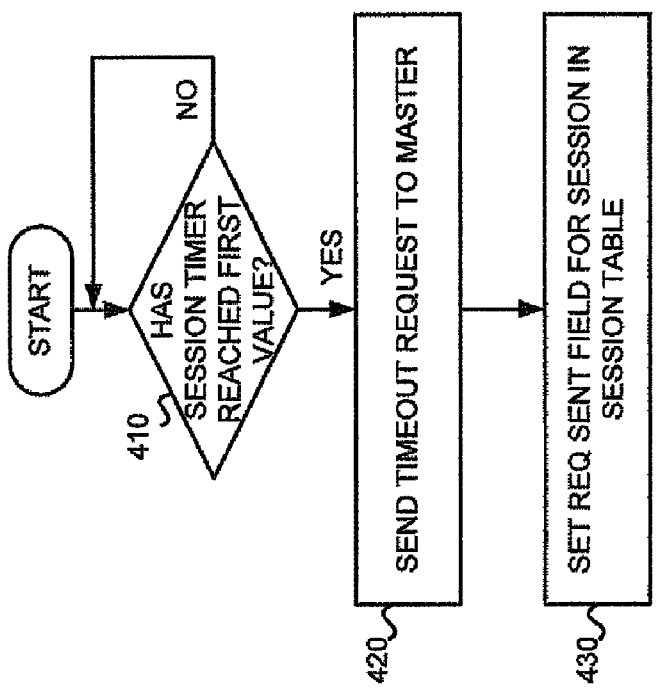
FIGS. 4-8 are flowcharts of exemplary processing for updating session tables in an implementation consistent with the principles of the invention.

With this background in mind, processing may begin with backup network device 120 determining whether the session timer (i.e., the counter value in timer field 320 of session table 125) for the new session (or any other session in session table 125) has reached a first value (block 410, FIG. 4). The first value may correspond to a predetermined value prior to the session timer expiring. In one implementation consistent with the principles of the invention, the first value may include a value between 5 and 15 seconds. In some implementations, the first value may be a value that is randomly selected for the new session between 5 and 15 seconds (or some other time range). Backup network device 120 may determine whether the session timer has reached the first value by comparing the current counter value in timer field 320 to the predetermined first value.

If the session timer has not reached the first value (i.e., the counter value does not match the predetermined first value), backup network device 120 may continue to monitor the session timer. If, on the other hand, the session timer has reached the first value, backup network device 120 may send a timeout request message to master network device 110 (block 420), via, for example, link 130. The timeout request message may include, for example, the identifier of the session (i.e., the session number from session number field 310).

Backup network device 120 may also set the flag in the request sent field 330 of session table 125 corresponding to the session (block 430). To set the flag, backup network device 120 may, as indicated above, store a "1" in request sent field 330.

Figure 5:
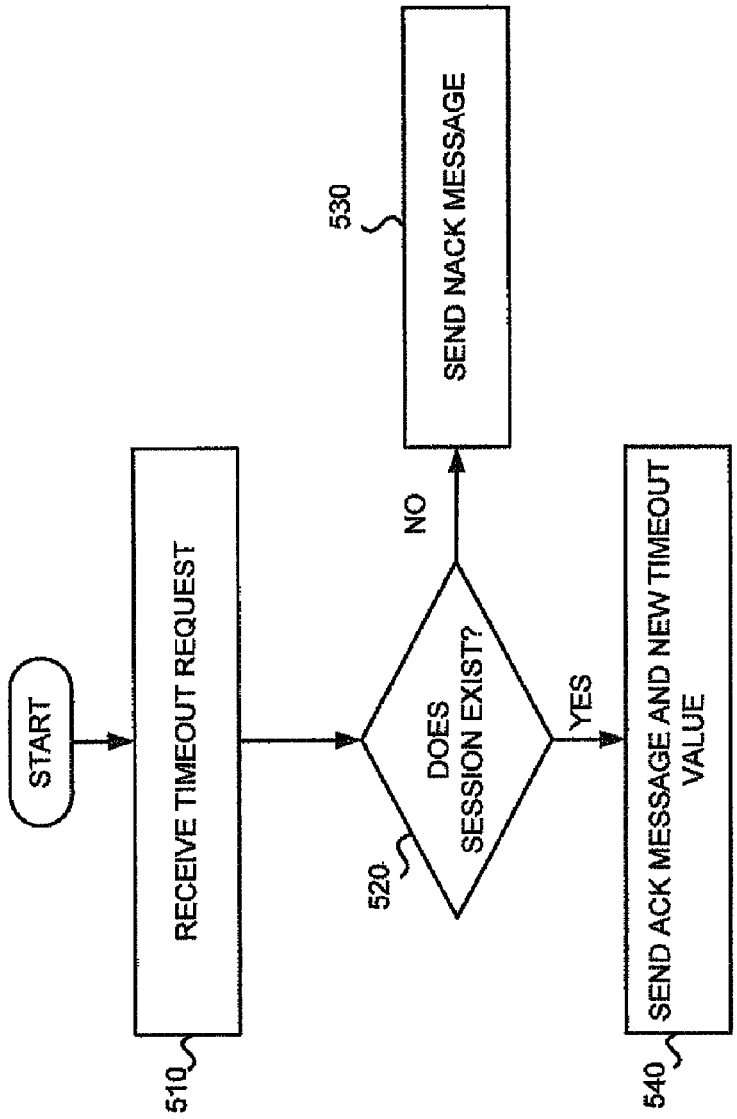

Master network device 110 may receive the timeout request message from backup device 120 (block 510, FIG. 5). Master network device 110 may determine whether the session identified in the timeout request message exists in its session table 115 (block 520). Master network device 110 may determine whether the particular session exists by comparing the session number from the timeout request message to the session numbers stored in session number field 310 of session table 115. If the session number from the timeout request message matches a session number stored in session table 115, then master device 110 may determine that the session exists. If, on the other hand, the session number from the timeout request message does not match a session number stored in session table 115, then master device 110 may determine that the session does not exist.

If master network device 110 determines that the session does not exist in session table 115, master network device 110 may send a non-acknowledgment message to backup network device 120 (block 530) via, for example, link 130. The non-acknowledgment message may include the session number from the timeout request message. The non-acknowledgment message informs backup network device 120 that the session identified in the non-acknowledgment message no longer exists in session table 115 of master network device 110.

If, on the other hand, master network device 110 determines that the session exists in session table 115, master network device 110 may retrieve the current counter value from timer field 320 of session table 115 for that session and may send an acknowledgment message to backup network device 120 (block 540) via, for example, link 130. The acknowledgment message may include the session number and the current counter value.

Figure 6:
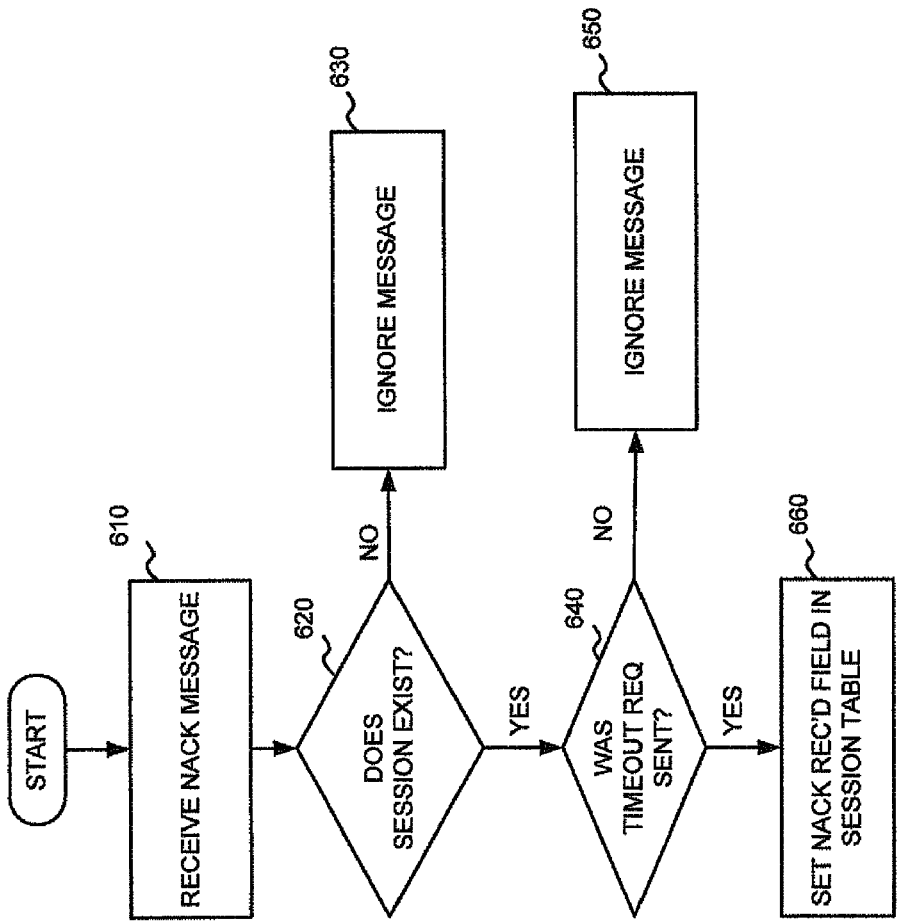

Assume, with respect to FIG. 6, that backup network device 120 receives a non-acknowledgment message from master network device 110 (block 610). Backup network device 120 may determine whether the session identified by the non-acknowledgment message exists in session table 125 (block 620). For example, backup network device 120 may compare the session number from the non-acknowledgment message to the session numbers stored in session number field 310 of session table 125. If the session number from the non-acknowledgment message matches a session number stored in session table 125, then backup network device 120 may determine that the session exists. If, on the other hand, the session number from the non-acknowledgment message does not match a session number stored in session table 125, then backup network device 120 may determine that the session does not exist (e.g., the session number may exist in another backup network device 120).

If backup network device 120 determines that the session identified by the non-acknowledgment message does not exist in session table 125, backup network device 120 may ignore the message (block 630). As set forth above, the non-acknowledgment message may be intended for another backup network device.

If, on the other hand, backup network device 120 determines that the session identified by non-acknowledgment message exists in session table 125, backup network device 120 may determine if a timeout request message has been sent by backup network device 120 for that session (block 640). To make this determination, backup network device 120 may check the appropriate entry in request sent field 330 of session table 125 for the session identified in the non-acknowledgment message to see if the flag has been set.

If backup network device 120 has not sent a timeout request message for this session (i.e., the flag in request sent field 330 has not been set), backup network device 120 may ignore the non-acknowledgment message (block 650) since another backup network device may have sent the request. If, on the other hand, backup network device 120 has sent a timeout request message for this session (i.e., the flag in request sent field 330 has been set), backup network device 120 may set the flag in non-acknowledgment received field 340 in session table 125 for the session identified in the non-acknowledgment message (block 660). Backup network device 120 may set the flag in non-acknowledgment received field 340 by, for example, storing a "1" in field 340.

Figure 7:
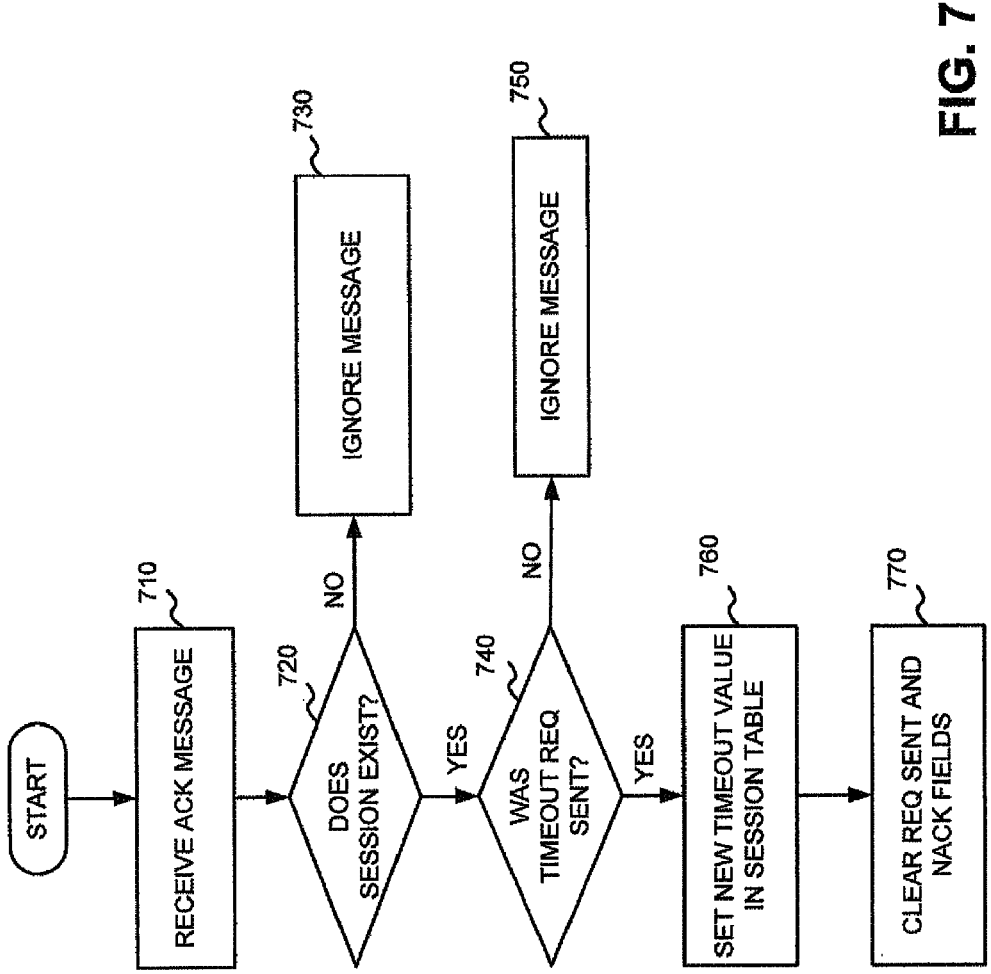

Assume, with respect to FIG. 7, that backup network device 120 receives an acknowledgment message from master network device 110 (block 710). Backup network device 120 may determine whether the session identified by the acknowledgment message exists in session table 125 (block 720). For example, backup network device 120 may compare the session number from the acknowledgment message to the session numbers stored in session number field 310 of session table 125. If the session number from the acknowledgment message matches a session number stored in session table 125, then backup network device 120 may determine that the session exists. If, on the other hand, the session number from the acknowledgment message does not match a session number stored in session table 125, then backup network device 120 may determine that the session does not exist (e.g., the session number may exist in another backup network device 120).

If backup network device 120 determines that the session identified by the acknowledgment message does not exist in session table 125, backup network device 120 may ignore the message (block 730). As set forth above, the acknowledgment message may be intended for another backup network device.

If, on the other hand, backup network device 120 determines that the session identified by acknowledgment message exists in session table 125, backup network device 120 may determine if a timeout request message has been sent by backup network device 120 for that session (block 740). To make this determination, backup network device 120 may check the appropriate entry in request sent field 330 of session table 125 for the session identified in the acknowledgment message to see if the flag has been set.

If backup network device 120 has not sent a timeout request message for this session (i.e., the flag in request sent field 330 has not been set), backup network device 120 may ignore the acknowledgment message (block 750) since another backup network device may have sent the request. If, on the other hand, backup network device 120 has sent a timeout request message for this session (i.e., the flag in request sent field 330 has been set), backup network device 120 may set a new counter value in timer field 320 of session table 125 for the session identified in the acknowledgment message (block 760). Backup network device 120 retrieve the counter value from the acknowledgment message and determine a new counter value based on the retrieved counter value. For example, backup network device 120 may multiply the retrieved counter value by a factor (e.g., 8 or some other value) and store the resulting counter value in timer field 320 as a new counter value.

Backup network device 120 may clear the appropriate request sent field 330 in session table 125 (block 770). To clear the request sent field 330, backup network device 120 may store a "0" in field 330.

In some instances, backup network device 120 may receive an acknowledgment message and a non-acknowledgment message for the same session (e.g., in instances where multiple master network devices exist). In these instances, backup network device 120 may act on the acknowledgment message and ignore the non-acknowledgment message.

Figure 8:
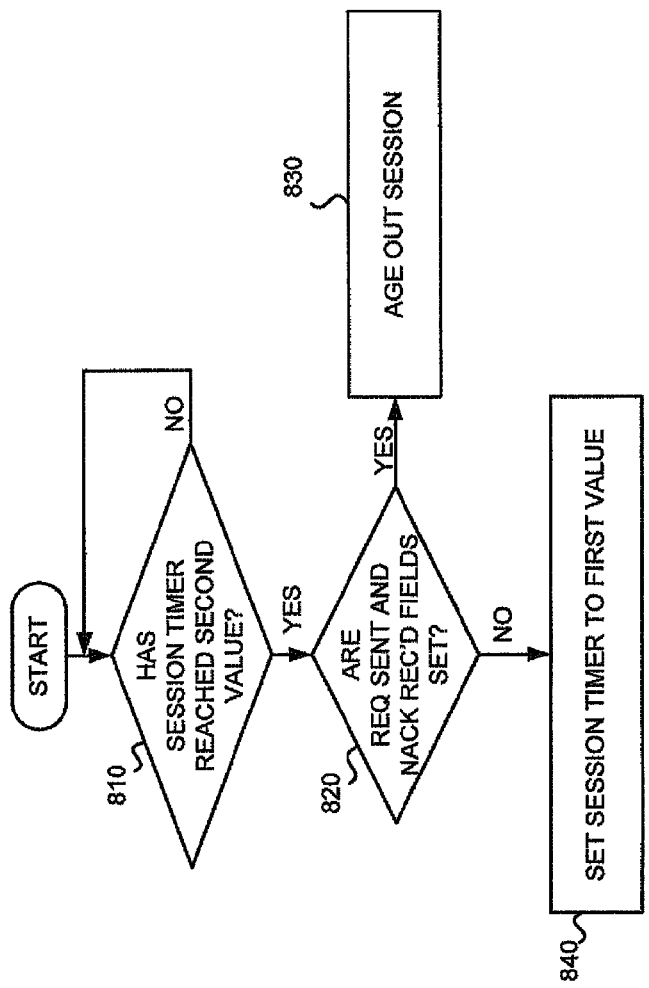

With reference to FIG. 8, backup network device 120 may determine whether the session timer (i.e., the counter value in timer field 320 of session table 125) for any session in session table 125 has reached a second value (block 810). The second value may correspond to zero in one implementation consistent with the principles of the invention. In an alternative implementation, the second value may correspond to a non-zero value.

If the session timer for a session has not reached the second value (i.e., the counter value does not match the second value), backup network device 120 may continue to monitor the session timer of each session. If, on the other hand, the session timer has reached the second value for a particular session, backup network device 120 may determine if the flags in request sent field 330 and non-acknowledgment received field 340 for that session have been set (block 820). For example, backup network device 120 may check to see if a "1" has been stored in request sent and non-acknowledgment received fields 330 and 340 in session table 125 for that particular session.

If the flags have been set in request sent field 330 and non-acknowledgment received field 340 of session table 125 for that session, backup network device 120 may age out (or close) the session (block 830). For example, backup network device 120 may remove the entry in session table 125 corresponding to the session.

If the flag has not been set in request sent field 330 and/or in non-acknowledgment received field 340 of session table 125 for that session, backup network device 120 may set the session timer for that session to the first value (block 840). For example, backup network device 120 may store the first value in timer field 320 in session table 125 for that session. Processing may then return to FIG. 4 with backup network device 120 determining that the session timer for that session has reached the first value (block 410).

EXAMPLES

The following examples illustrate the processing described with respect to FIGS. 4-8. Assume, with respect to FIGS. 9A-9C, that session table 115 in master network device 110 includes an entry for a session (session number 900) that has a session timer with a current counter value of 500 seconds. Assume further that backup network device 120 includes an entry for session number 900 in its session table 125. Assume further that the first value for session number 900 is 10 seconds.

With reference to FIG. 9A, processing may begin with backup network device 120 identifying that the session timer for session number 900 has reached the first value (i.e., 10 seconds). In response, backup network device 120 may send a timeout request message to master network device 110 via link 130. The timeout request message may include the session number (i.e., 900) for the session whose timer has reached the first value. Backup network device 120 may also set the flag in the request sent field of session table 125 for session number 900, as illustrated in FIG. 9A.

With reference to FIG. 9B, master network device 110 may receive the session timeout request message from backup network device 120. Master network device 110 may parse the message to identify the session to which the timeout request message has been sent. In this example, master network device 110 may identify that the timeout request message relates to session number 900. Master network device 110 may determine whether session number 900 exists in its session table 115. In this example, master network device 110 may determine that session number 900 does exist. Master network device 110 may then send an acknowledgment message to backup network device 120 via link 130. The acknowledgment message may include the session number (i.e., 900) and the current counter value for session number 900 from session table 115 (i.e., 500 seconds).

Figure 9C:
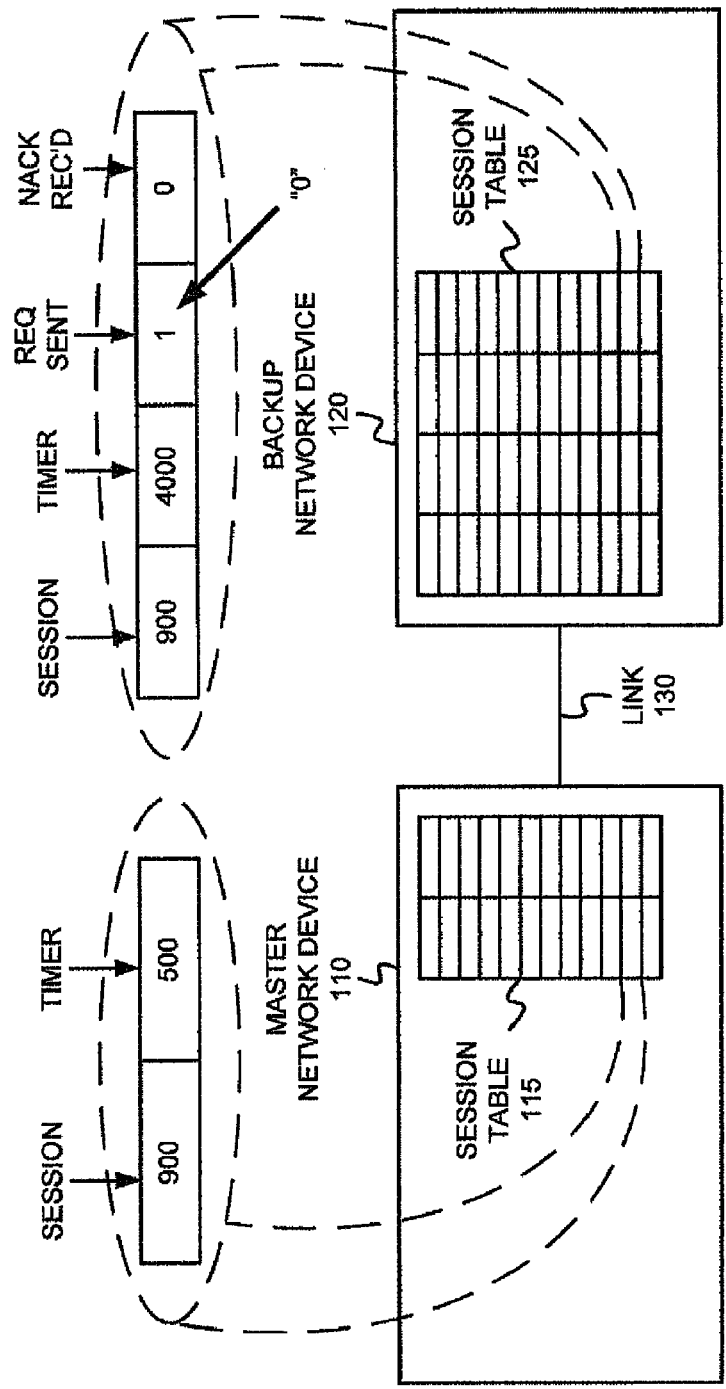

With reference to FIG. 9C, backup network device 120 may receive the acknowledgment message from master network device 110. Backup network device 120 may parse the acknowledgment message to identify the session to which the acknowledgment message has been sent. In this example, backup network device 120 may identify that the acknowledgment message relates to session number 900. Backup network device 120 may determine whether session number 900 exists in its session table 125. In this example, backup network device 120 may determine that session number 900 does exist. Backup network device 120 may then determine whether a timeout request message has been sent for session number 900. Since the flag has been set in the request sent field for session number 900, backup network device 120 may determine that a timeout request message has been sent for session number 900. Backup network device 120 may parse the acknowledgment message to retrieve the session timer value stored by master network device 110, which is 500 seconds in this example. Backup network device 120 may multiply the session timer value by a factor, which is 8 in this example, and store the resulting timer value in session table 125 for session number 900. Backup network device 120 may also clear the request sent flag for session number 900 by, for example, storing a "0" in the request sent field of session table 125 for session number 900. In this way, session table 125 can be updated so to prevent sessions from being prematurely aged out.

In a second example, assume, with respect to FIGS. 10A-10E, that session table 125 in backup network device 120 includes an entry for a session (session number 900) that has a session timer with a current counter value of 10 seconds. Assume further that master network device 110 does not include an entry for session number 900 in its session table 115.

Figure 10A:
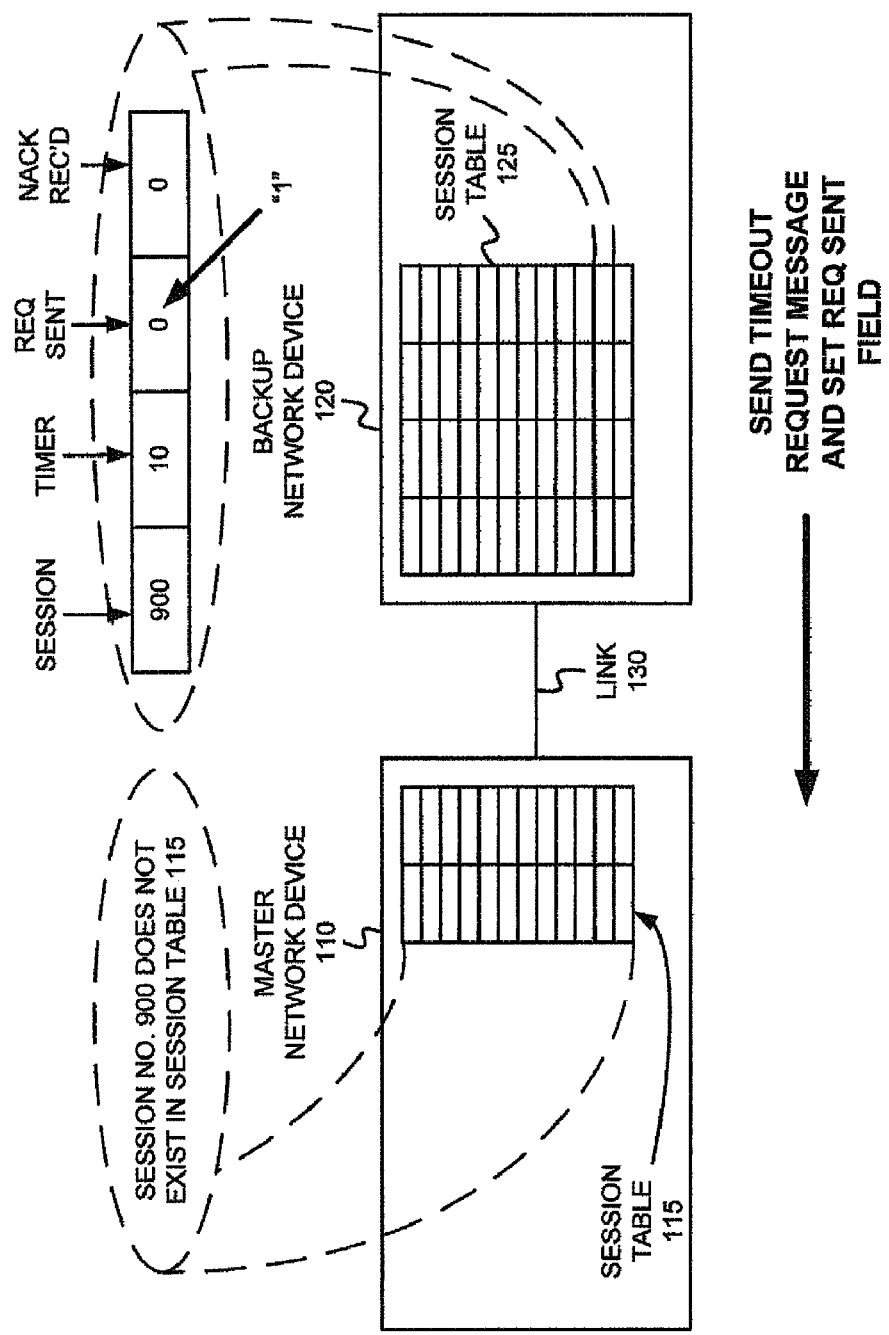
FIGS. 10A-10E illustrate an exemplary process for aging out a session entry in an implementation consistent with the principles of the invention.

With reference to FIG. 10A, processing may begin with backup network device 120 identifying that the session timer for session number 900 has reached the first value (i.e., 10 seconds). In response, backup network device 120 may send a timeout request message to master network device 110 via link 130. The timeout request message may include the session number (i.e., 900) for the session whose timer has reached the first value. Backup network device 120 may also set the flag in the request sent field of session table 125 for session number 900, as illustrated in FIG. 10A.

Figure 10B:
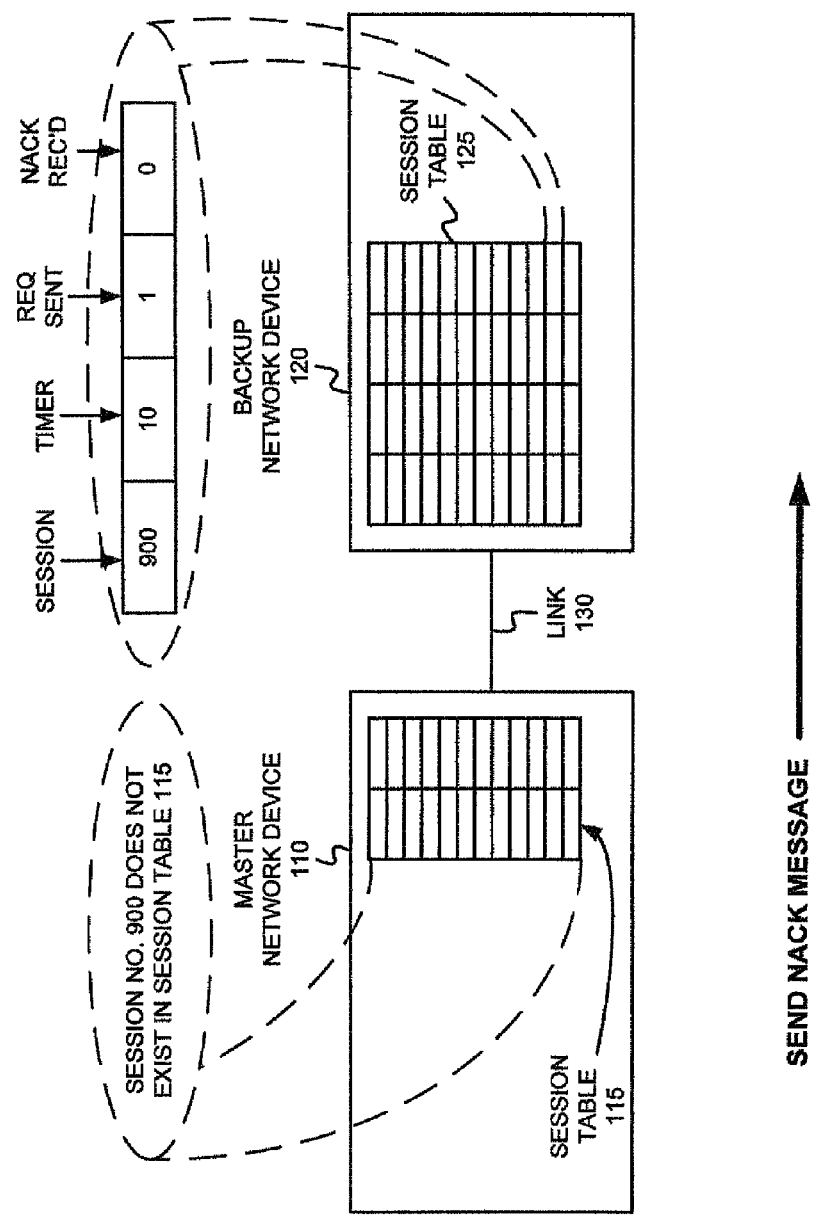

With reference to FIG. 10B, master network device 110 may receive the session timeout request message from backup network device 120. Master network device 110 may parse the message to identify the session to which the timeout request message has been sent. In this example, master network device 110 may identify that the timeout request message relates to session number 900. Master network device 110 may determine whether session number 900 exists in its session table 115. In this example, master network device 110 may determine that session number 900 does not exist in session table 115. Master network device 110 may then send a non-acknowledgment message to backup network device 120 via link 130. The non-acknowledgment message may include the session number (i.e., 900).

Figure 10C:
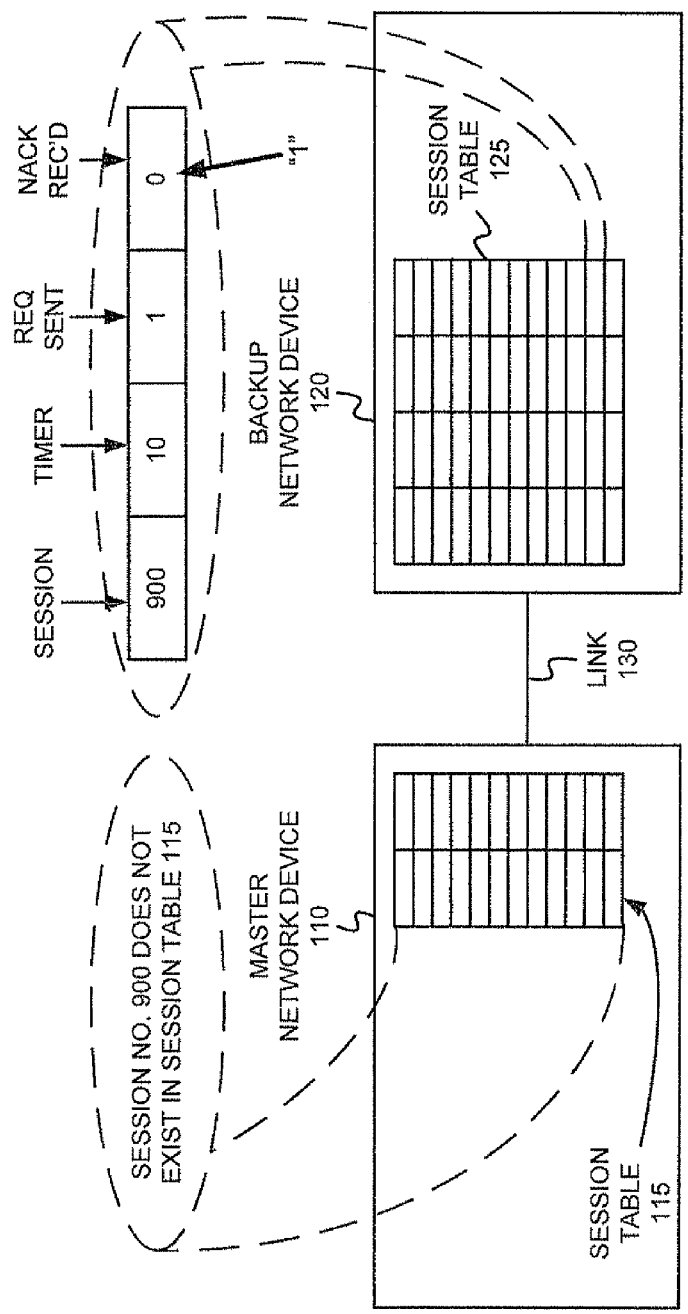

With reference to FIG. 10C, backup network device 120 may receive the non-acknowledgment message from master network device 110. Backup network device 120 may parse the non-acknowledgment message to identify the session to which the non-acknowledgment message has been sent. In this example, backup network device 120 may identify that the non-acknowledgment message relates to session number 900. Backup network device 120 may determine whether session number 900 exists in its session table 125. In this example, backup network device 120 may determine that session number 900 does exist. Backup network device 120 may then determine whether a timeout request message has been sent for session number 900. Since the flag has been set in the request sent field for session number 900, backup network device 120 may determine that a timeout request message has been sent for session number 900. Backup network device 120 may then set the flag for the non-acknowledgment received field by, for example, storing a "1" in the non-acknowledgment received field of session table 125 for session number 900, as illustrated in FIG. 10C.

Figure 10D:
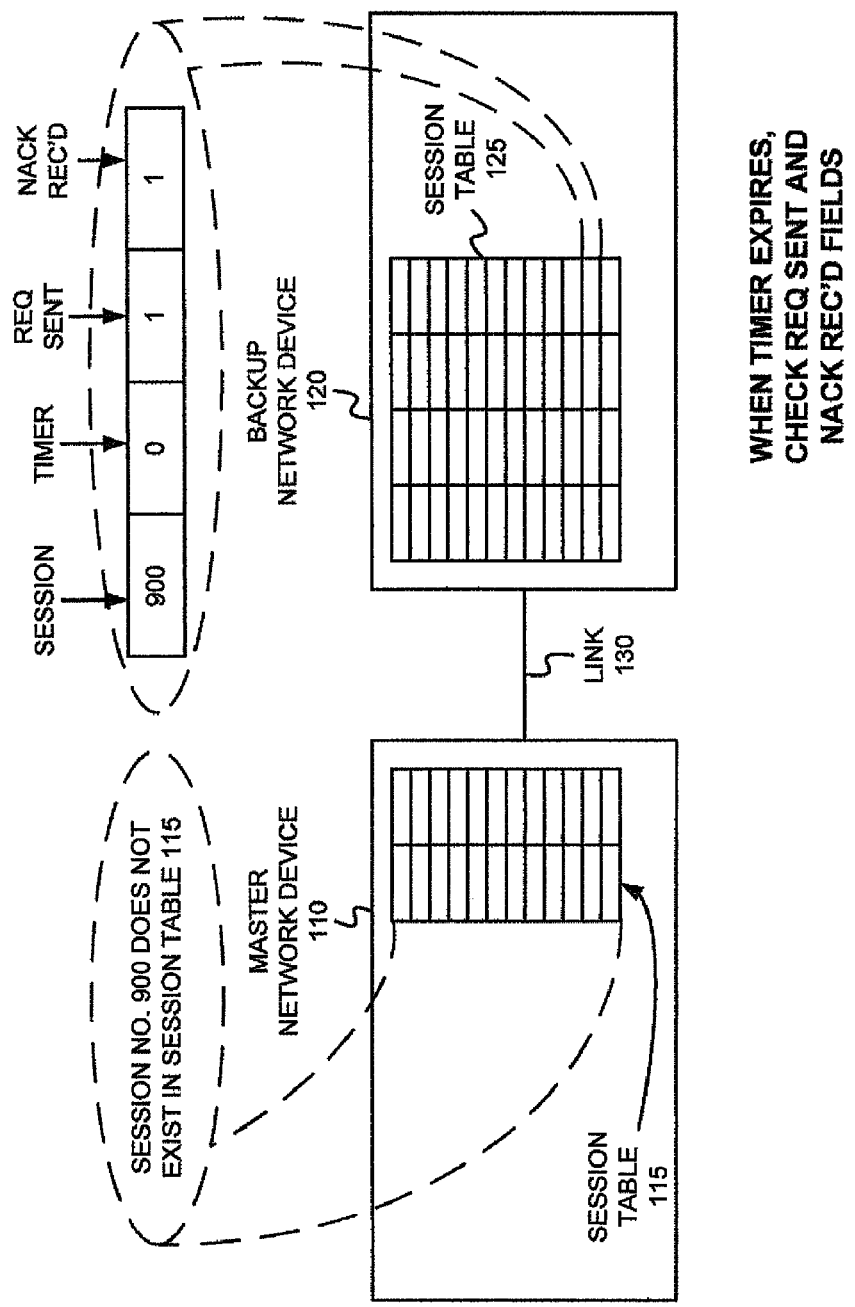
Figure 10E:
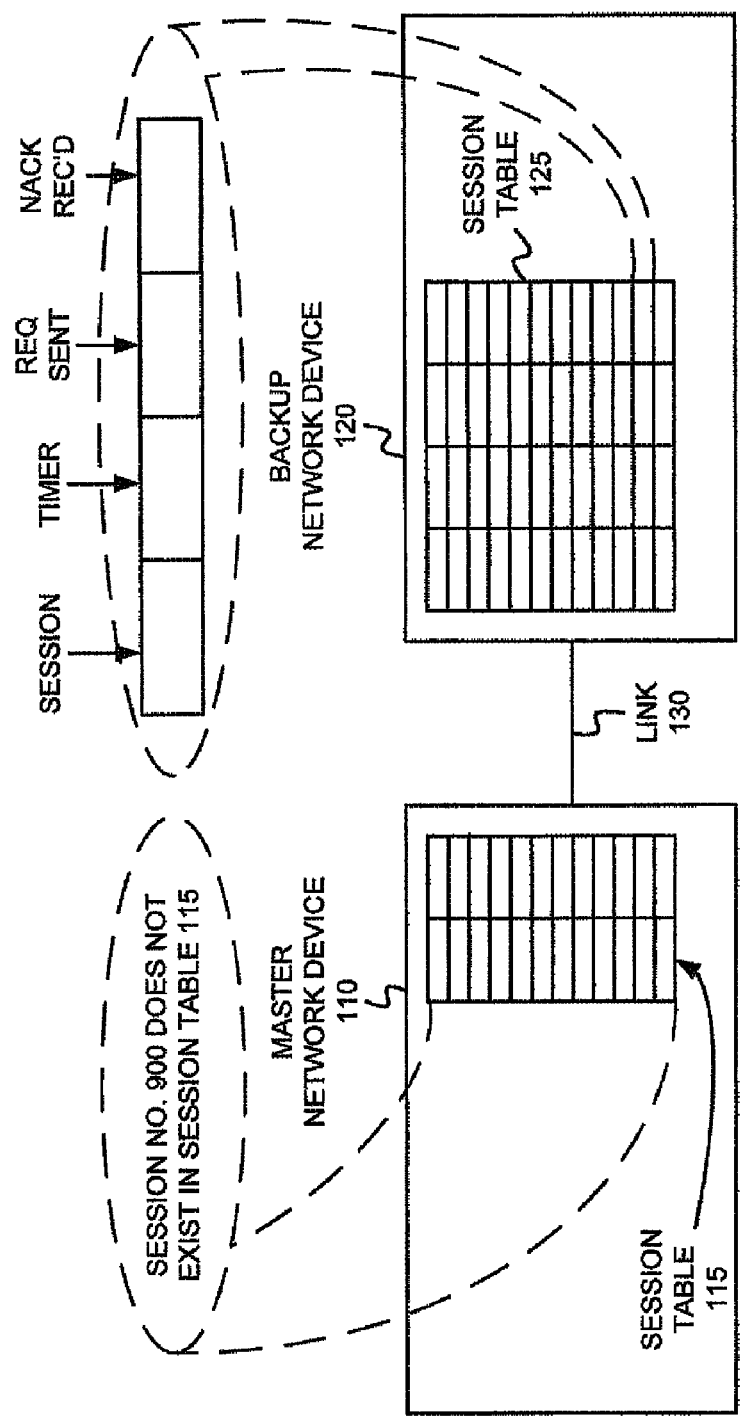

With reference to FIG. 10D, backup network device 120 may detect that the session timer for session number 900 has reached a second value ("0" in this example). Backup network device 120 may determine whether the flags in the request sent and non-acknowledgment received fields in session table 125 for session number 900 have been set. Since both of the flags have been set, backup network device 120 may determine that session number 900 should be aged out. With reference to FIG. 10E, backup network device 120 may age out session number 900 by clearing the entry from session table 125 for session number 900. In this way, backup network device 120 can avoid prematurely aging out sessions from session table 125.

CONCLUSION

Implementations consistent with the principles of the invention improve traffic forwarding within a communications network. In an exemplary implementation, a master device includes a session table that includes entries for each communication session handled by the master device. A backup device includes a session table that includes entries corresponding to the entries in the session table of the master device. Through the exchange of status messages between the backup device and the master device, the backup device may avoid prematurely closing (or aging out) an entry in its session table.

The foregoing description of exemplary implementations consistent with the principles of the invention provides illustration and description, but is not intended to be exhaustive or to limit the invention to the precise form disclosed. Modifications and variations are possible in light of the above teachings or may be acquired from practice of the invention. For example, while series of acts have been described with regard to FIGS. 4-10E, the order of the acts may be varied in other implementations consistent with the invention. Moreover, non-dependent acts may be implemented in parallel.

It will be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the invention. Thus, the operation and behavior of the aspects were described without reference to the specific software code—it being understood that one of ordinary skill in the art would be able to design software and control hardware to implement the aspects based on the description herein.

Further, certain portions of the invention may be implemented as "logic" that performs one or more functions. This logic may include hardware, such as an application specific integrated circuit or a field programmable gate array, software, or a combination of hardware and software.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
   storing, by a backup network device, information, associated with a plurality of communication sessions that are supported by a master network device, in a session table of the backup network device, the information including identification information of a communication session, of the plurality of communication sessions, and a session timer associated with the communication session;

detecting, by the backup network device, that the session timer, associated with the communication session, has reached a particular value;

sending, by the backup network device, a first message to the master network device based on detecting that the session timer has reached the particular value, the first message including the identification information of the communication session;

receiving, by the backup network device, a second message or a third message, from the master network device, based on sending the first message to the master network device;

determining, by the backup network device, whether the session timer, associated with the communication session, has expired;

removing, by the backup network device, an entry, corresponding to the communication session, from the session table, when:
- the session timer has expired,
- the first message has been sent to the master network device regarding the communication session, and
- the second message has been received from the master network device, the second message indicating that information identifying the communication session does not exist in a session table of the master network device; and setting, by the backup network device, the session timer to another value when the third message has been received from the mater network device, the third message:
- indicating that the information identifying the communication session exists in the session table of the master network device, and
- including the identification information included in the first message and a timer value, the other value being based on the timer value included in the third message.

2. The method of claim 1 where the particular value is randomly selected.

3. The method of claim 1 where the master network device determines whether the communication session exists in the session table of the master network device by comparing the identification information, included in the first message, to identification information stored in the session table of the master network device, and
where the master device sends the second message to the backup network device when the master network device determines that the communication session does not exist in the session table of the master network device, the second message including the identification information included in the first message.

4. The method of claim 3 where the master network device sends the third message to the backup network device when the master network device determines that the communication session exists in the session table of the master network device.

5. The method of claim 4 further comprising:
receiving the third message; and
setting the session timer based on receiving the third message.

6. The method of claim 5 further comprising:
determining the other value by multiplying the timer value, included in the third message, by a particular value.

7. The method of claim 1 further comprising:
setting a first flag, of the session table of the backup network device, based on sending the first message, the first flag indicating that the first message has been sent; and
setting a second flag, of the session table of the backup network device, based on receiving the second message, the second flag indicating that the second message has been received.

8. The method of claim 7 where removing the entry corresponding to the communication session includes:
removing the entry corresponding to the communication session when the first flag has been set and the second flag has been set.

9. A backup network device comprising:
a memory to store instructions;
a processor to execute the instructions to:
store information, associated with one or more communication sessions supported by a master network device, in a session table of the backup network device, the information including identification information of a communication session, of the one or more communication sessions, and a session timer associated with the communication session,
detect that the session timer, associated with the communication session, has reached a particular value,
send a first message to the master network device based on detecting that the session timer has reached the particular value, the first message including the identification information of the communication session,
receive a second message or a third message from the master device, based on sending the first message to the master device,
determine whether the session timer, associated with the communication session, has expired,
remove an entry, corresponding to the communication session, from the session table of the backup network device when:
the session timer has expired,
the first message has been sent to the master network device regarding the communication session, and
the second message has been received from the master network device, the second message including the identification information and indicating that information identifying the communication session, identified by the identification information, does not exist in a session table of the master network device, and
set the session timer, in the session table of the backup network device, to another value when the third message has been received from the master network device, the third message:
indicating that the information identifying the communication session exists in the session table of the master network device, and
including the identification information and a timer value associated with the communication session, the other value being based on the timer value included in the third message.

10. The backup network device of claim 9 where the processor is further to:
detect that the session timer associated with the communication session has reached a second particular value, and
determine that the session timer has expired when the session timer has reached the second particular value.

11. The backup network device of claim 9 where the processor is further to:
receive the second message from the master network device, where the second message is a non-acknowledgment message from the master network device indicating that the information identifying the communication session does not exist in the session table of the master network device,
determine whether a first flag, in the session table of the backup network device, is set, and
set a second flag, in the session table of the backup network device, based on receiving the second message and when the first flag is set.

12. The backup network device of claim 9 where the processor is further to:
set a first flag, in a first field of the session table of the backup network device,
based on sending the first message; and
set a second flag, in a second field of the session table of the backup network device, based on receiving the second message.

13. A master network device comprising:
a session table to store session information identifying a plurality of sessions supported by the master network device, the session table including an entry for each session of the plurality of sessions,
each entry in the session table including a first field to store a session identifier of a respective session of the plurality of sessions, and a second field to store a session timer of the respective session; and logic, implemented at least partially using hardware, to:
receive a first message from a backup network device, the first message including first session information identifying a first session,
determine, based on the first session information that is included in the first message, whether a session identifier, corresponding to the first session, exists in the session table,
after receiving the first message,
send a second message to the backup network device when the session identifier, corresponding to the first session, does not exist in the session table,
the second message including the first session information, and
the second message causing the backup network device to remove an entry, corresponding to the first session, from a memory of the backup device, and
send a third message to the backup network device when the session identifier, corresponding to the first session, exists in the session table,
the third message including the first session information and a value of the session timer of the first session, and
the third message causing the backup network device to set a timer value, in the entry corresponding to the first session in the memory, to another timer value that is based on the value of the session timer included in the third message.

14. The master network device of claim 13 where the logic is further to:
compare the first session information, that is included in the first message, to the session identifiers of the plurality of sessions to determine whether the session identifier, corresponding to the first session, exists in the session table of the master network device.

15. A non-transitory computer-readable medium storing instructions, the instructions comprising:
a plurality of instructions which, when executed by a first network device, cause the first network device to:
store information, associated with a plurality of communication sessions that are supported by a second network device, in a session table in a memory of the first network device, the information including identification information of a communication session, of the plurality of communication sessions, and a session timer associated with the communication session;
detect that the session timer has reached a particular value;
send a first message to the second network device based on detecting that the session timer has reached the particular value, the first message including the identification information of the communication session;
receive a second message or a third message, from the second network device, based on sending the first message to the second network device;
determine whether the session timer has expired;
remove an entry, corresponding to the communication session, from the session table when:
the session timer has expired,
the first message has been sent to the second network device, and
the second message has been received from the second network device, the second message indicating that information identifying the communication session does not exist in a memory of the second network device; and
set the session timer to another value when the third message has been received from the second network device, the third message:
indicating that the information identifying the communication session exists in the memory of the second network device, and
including the identification information included in the first message and a timer value, the other value being based on the timer value included in the third message.

16. The non-transitory computer-readable of claim 15 the instructions further comprising a plurality of instructions which, when executed by the first network device, cause the first network device to:
determine whether the identification information of the communication session is stored in the session table of the first network device; and
ignore the second message or the third message when the identification information of the communication session is not stored in the session table of the first network device.

17. The non-transitory computer-readable of claim 15 the instructions further comprising a plurality of instructions which, when executed by the first network device, cause the first network device to:
determine whether a flag, in the session table of the first network device, is set, the flag indicating whether the first message has been sent; and
ignore the second message or the third message when the flag has not been set.

18. A method comprising:
storing, by a first network device and in a session table in a memory of the first network device, session information identifying a plurality of sessions supported by the first network device, the session table of the first network device including an entry for each session of the plurality of sessions,
each entry in the session table including a session identifier of a respective session, of the plurality of sessions, and a session timer of the respective session;
receiving, by the first network device, a first message from a second network device, the first message including session information identifying a particular session;

determining, by the first network device and based on the session information that is included in the first message, whether a session identifier, corresponding to the particular session, exists in the session table of the first network device;

sending, by the first network device, a second message to the second network device when the session identifier, corresponding to the particular session, does not exist in the session table of the first network device, the second message including the session information, and the second message causing the second network device to remove an entry, corresponding to the particular session, from a memory of the second network device; and sending, by the first network device, a third message to the second network device when the session identifier, corresponding to the particular session, exists in the session table of the first network device, the third message including the session information and a value of the session timer of the particular session, and the third message causing the second network device to set a timer value, in the entry corresponding to the particular session in the memory of the second network device, to another timer value that is based on the value of the session timer included in the third message.

19. The method of claim 18 further comprising:

comparing the session information, that is included in the first message, to the session identifiers of the plurality of sessions, stored in the session table of the first network device, to determine whether the session identifier, corresponding to the particular session, exists in the session table of the first network device.

20. A non-transitory computer-readable medium storing instructions, the instructions comprising:

a plurality of instructions which, when executed by a first network device, cause the first network device to:

store, in a session table in a memory of the first network device, session information identifying a plurality of sessions associated with the first network device, the session table of the first network device including an entry for each session of the plurality of sessions, each entry in the session table including a session identifier of a respective session, of the plurality of sessions, and a session timer of the respective session;

receive a first message from a second network device, the first message including session information identifying a particular session;

determine, based on the session information that is included in the first message, whether a session identifier, corresponding to the particular session, exists in the session table of the first network device;

send, a second message to the second network device when the session identifier, corresponding to the particular session, does not exist in the session table of the first network device, the second message including the session information, and the second message causing the second network device to remove an entry, corresponding to the session, from a memory of the second network device, and send a third message to the second network device when the session identifier, corresponding to the particular session, exists in the session table of the first network device, the third message including the session information and a value of the session timer of the particular session, and the third message causing the second network device to set a timer value, in the entry corresponding to the particular session in the memory of the second network device, to another timer value that is based on the value of the session timer included in the third message.

21. The non-transitory computer-readable of claim 20 the instructions further comprising:

one or more instructions, when executed by the first network device, cause the first network device to compare the session information, that is included in the first message, to the session identifiers of the plurality of sessions, stored in the session table of the first network device, to determine whether the session identifier, corresponding to the particular session, exists in the session table of the first network device.

* * * * *